(12) United States Patent
Bernhard et al.

(10) Patent No.: US 6,905,117 B2
(45) Date of Patent: Jun. 14, 2005

(54) HOLDING MEANS FOR HOLDING TWO PARTS ON EACH OTHER

(75) Inventors: Franz-Xaver Bernhard, Spaichingen (DE); Rainer Kohler, Hausen O.V. (DE)

(73) Assignee: Maschinenfabrik Berthold Hermle AG, Gosheim (DE)

( * ) Notice: Subject to any disclaimer, the term of this patent is extended or adjusted under 35 U.S.C. 154(b) by 0 days.

(21) Appl. No.: 10/639,468

(22) Filed: Aug. 13, 2003

(65) Prior Publication Data

US 2004/0046302 A1 Mar. 11, 2004

(30) Foreign Application Priority Data

Sep. 9, 2002 (EP) .............................................. 02400041

(51) Int. Cl.⁷ ................................................. B23Q 3/02
(52) U.S. Cl. ...................................................... 269/309
(58) Field of Search ................................ 269/309, 310, 269/48.1, 32, 50, 20, 900; 279/121, 4.12

(56) References Cited

U.S. PATENT DOCUMENTS

| | | | | |
|---|---|---|---|---|
| 5,190,272 A | * | 3/1993 | Zika et al. ................... | 269/309 |
| 6,095,509 A | * | 8/2000 | Yonezawa .................... | 269/309 |
| 6,619,646 B2 | * | 9/2003 | Yonezawa .................... | 269/309 |
| 2003/0071407 A1 | * | 4/2003 | Haruna ........................ | 269/309 |
| 2004/0046302 A1 | * | 3/2004 | Bernhard et al. ........... | 269/309 |
| 2004/0113346 A1 | * | 6/2004 | Kawakami et al. ......... | 269/309 |

FOREIGN PATENT DOCUMENTS

| | | |
|---|---|---|
| DE | 43 41 046 | 6/1995 |
| DE | 198 41 928 | 3/2000 |
| DE | 199 17 146 | 10/2000 |
| DE | 201 02 698 | 8/2001 |
| EP | 0 794 035 | 9/1997 |

* cited by examiner

*Primary Examiner*—Lee D. Wilson
(74) *Attorney, Agent, or Firm*—Browdy and Neimark, P.L.L.C.

(57) ABSTRACT

A clamping device for clamping two parts which more particularly serves for fixing a workpiece palette on a workpiece table. A bolster provided with a projecting shape element is secured to the first part and a cooperating part provided with a recess for receiving the shape element is secured to the second part. A sliding element which runs through the projecting shape element has at least one peripheral recess, into which at least one clamping element is engaged. The clamping element can be moved in a through hole in the shape element and fits in a non-clamping position, and on sliding the sliding element the clamping element is thrust outward into the clamping position. In the clamping position the clamping element interlocks in a recess in the cooperating part.

13 Claims, 3 Drawing Sheets

HOLDING MEANS FOR HOLDING TWO PARTS ON EACH OTHER

BACKGROUND OF THE INVENTION

The invention relates to a holding means for holding two parts together and more especially for fixing a workpiece palette on a workpiece table, comprising a bolster able to be secured to the first part, such bolster possessing a projecting shape element, a cooperating part adapted to be secured to the second part, such cooperating part possessing a recess to receive the shape element, and a sliding element running in the projecting shape element, such sliding element possessing at least one peripheral recess into which at least one clamping element, which is able to be moved in a through hole in the shape element, fits in the non-clamped state, sliding of the sliding element causing the clamping element to be thrust outward into a clamping position thereof, in which it interlocks with the cooperating part in the recess thereof.

THE PRIOR ART

In the case of a prior art holding means disclosed in the German patent publication 19,917,146 A1 of this type the clamping elements are in the form of balls. Such balls must be held to prevent them dropping out of a ball cage in a complex manner, for example by swaging the cage. On the other hand they are not able to be sealed off to prevent cooling lubricant and fragments produced by machining making their way into the clamping system. Furthermore, the contact face between the bolster and the cooperating part is extremely large so that in this case as well the danger of deposits of foreign matter collecting is substantial. Full control of raising and lowering is not possible so that on putting down the top part the contact face may be damaged. Preliminary centering or positioning is limited in an unsatisfactory manner.

In the case of German patent publications 19,841,928 A1, 19,834,040 and 4,135,418 A1 as well disclosing holding means balls are also employed as clamping elements and have the above mentioned disadvantages. Owing to the sliding elements entering from above the building up of deposits of falling shavings and lubricating coolants can only be prevented with difficulty. Deposits of dirt readily adhere and themselves prevent precise and plane-parallel descent of the top part onto the bottom part. Owing to the necessary energy storing spring the entire arrangement becomes complex and expensive and furthermore liable to defects and rapid wear. Complex sealing measures are necessary. Since the balls may not be sealed off separately, all adjacent components must be sealed off in a complex fashion. Moreover, preliminary centering and alignment is only possible to an extremely limited extent. Finally the German patent publication 10,031,103 A1 discloses a holding means, which as a clamping mechanism has a complex clamping tongs. Sealing off of the clamping tongs against the ingress of dirt is extremely elaborate and accordingly unsatisfactory.

SHORT SUMMARY OF THE INVENTION

One object of the invention is to create a holding means of the type initially mentioned in the case of which the ingress of lubricants and dirt as well the collection thereof may be prevented.

In order to achieve these and/or other objects appearing from the present specification, claims and drawings, in the present invention the clamping element possesses a central guide region with a linear guide function in the through hole, which has an annular groove to accommodate a sealing ring and on either side of the guide region hemispherical terminal regions are formed.

Owing to the configuration provided by the invention of the clamping element same may be provided with a sealing ring so that the ingress of lubricants and other foreign matter may be effectively prevented. Simultaneously the sealing ring prevents the clamping element dropping out of its guide hole so that there is an additional means for preventing falling out, as for example swaging, is unnecessary. The geometry of the clamping element ensures a linear guide action so that the axial clamping force of the sliding element may be split up into an axial and a radial force component. The radial force component then assumes the function of positioning (centering and clamping) in the horizontal plane. On the other hand the balls, as in past designs, may only clamp or hold tight and do not position or center the work. Owing to the two hemispherical terminal regions the clamping elements are guided by means of two spaced apart ring edges in the through hole so that skew running is prevented.

The features recited in the dependent and independent claims relate to further advantageous developments and improvements in the holding means of claim 1, alternative measures being indicated to achieve the aim set.

One of the two terminal regions of the clamping element, and more especially the outwardly facing terminal region, may have a flat which preferably in the non-clamped setting is substantially aligned with the outer face of the shape element. Accordingly the overall length can be reduced and a satisfactory linear guiding action may be ensured.

Preferably, at least three clamping elements are distributed about the periphery, five or seven clamping elements also leading to satisfactory results in order to attain the desired centering and clamping actions.

It is an advantage for the sliding element to be connected in a permanent or integral manner with a double acting piston, which slides in a cylinder hole in the bolster. In connection with the clamping elements running in the through hole this leads to a simple and compact means with a small number of components so that it is only necessary to have a single, simple and economic sealing means to prevent the ingress of lubricants and dirt. Owing to the double acting piston operated by pressure it is furthermore possible to do without the spring energy storage means as employed in the prior art. This design is therefore also independent of the design of the clamping elements and protection is claimed therefor as a sub-combination independent of claim 1.

In the non-tensioned outwardly extending home position the sliding element protrudes from the shape element, and the terminal face of the protruding region is designed for a mating face in the recess in the cooperating part. In this case the cooperating part may in an advantageous fashion firstly be centered in preliminary manner by the shape element and placed on the sliding element and then be deposited in a controlled manner with the aid of the piston on the centering faces or reference faces.

The at least one peripheral recess in the sliding element possesses an oblique actuating face for thrusting out the at least one clamping element into the clamping position during the lowering of the sliding element loaded with the cooperating part. In this case an extremely rapid and exact centering and clamping operation is possible.

The frustoconical shape element constituting a preliminary centering arrangement with the bell-like recess in the cooperating part, preferably possesses an annular centering bolster or rest face, preferably at its foot part or in the adjoining region of the bolster, for a corresponding mating face of the cooperating part. This relatively small annular bolster face is less liable to damage by dirt than a larger planar support or bolster in accordance with the prior art.

A further effective measure for the prevention of soiling and the building up of deposits of dirt is such that the shape element and/or the sliding element contain at least one fluid pressure duct whose at least one blow-off opening is directed toward the recess in the cooperating part. By deflection of the pressure jet into the recess dirt, shavings and lubricants will be removed from the recess, from the shape element and from the centering bolster faces or, respectively, reference faces so that an accurate lowering into place is ensured. By regular operation of this pressure jet on lowering into position deposits are furthermore effectively prevented. Preferably in the case of a bell-like design of the recess in the cooperating part it is possible for such jet and its deflection to be so optimized that optimum cleaning is ensured. This measure as well is claimed as a subcombination independently of the features of claims 1 and 4.

Furthermore it has been found to be an advantage to associate with the pressure duct a volumetric flow measuring means for checking the position, such volumetric flow measuring means being more particularly activated prior to reaching the clamping position and/or in the clamping position. The volumetric flow constitutes a measure for the movement together of the two parts so that the correct seat in the clamping position can be checked in a simple manner.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

DETAILED ACCOUNT OF WORKING EMBODIMENT OF THE INVENTION

Figure 1:
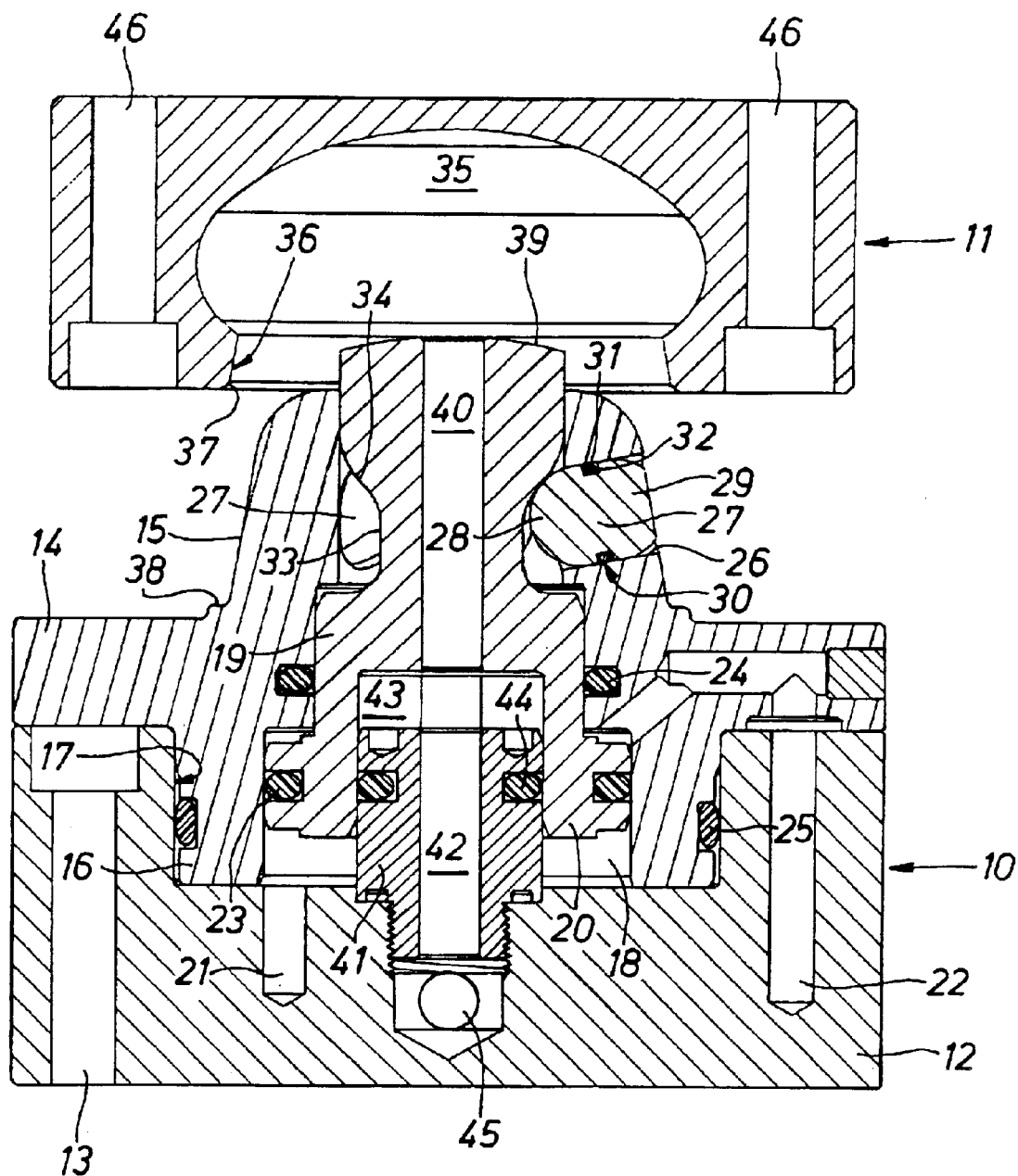
FIG. 1 shows a holding means in a vertical section as an embodiment of the invention in a state in which the top cooperating part is moving close to the bottom bolster.

The holding means represented in various different working positions comprises essentially a bottom bolster 10 and a top cooperating part 11, which may be clamped together. The bottom bolster 10 may be screwed to a first part (not illustrated) and the cooperating part 11 may be screwed to a second part (not illustrated) so that such two parts may be clamped together with the aid of the holding means or, respectively, fixed together. For this purpose there is a plurality of such holding means, as for example three or four thereof. Accordingly for example workpieces may be fixed as a second part on a workpiece table as a second part in a predetermined position. The workpieces may also be secured to a workpiece palette in order to secure the cooperating part 11 to the workpiece table. A further alternative is such that on the workpiece table a clamping plate is fixed which is provided with bolsters 10 so that the workpiece palette or, respectively, the workpieces may be secured with the aid of the holding means on such clamping plate. In general such holding means may be employed in all cases where two part are to be clamped together or fixed to each other in a predetermined accurate position.

The bottom bolster 10 comprises a base plate 12, which possesses screw holes 13 (only one screw hole 13 being visible in the sectional view) for the attachment by screwing, for example, on a workpiece table using holding screws, not illustrated. On this base plate 12 a draw-in element 14 is secured in a fashion which is not illustrated, it having an upwardly projecting frustoconical shape element 15. This draw-in element 14 has a bottom tubular extension 16 running into a corresponding cylindrical recess 17 in the base plate 12.

Figure 2:
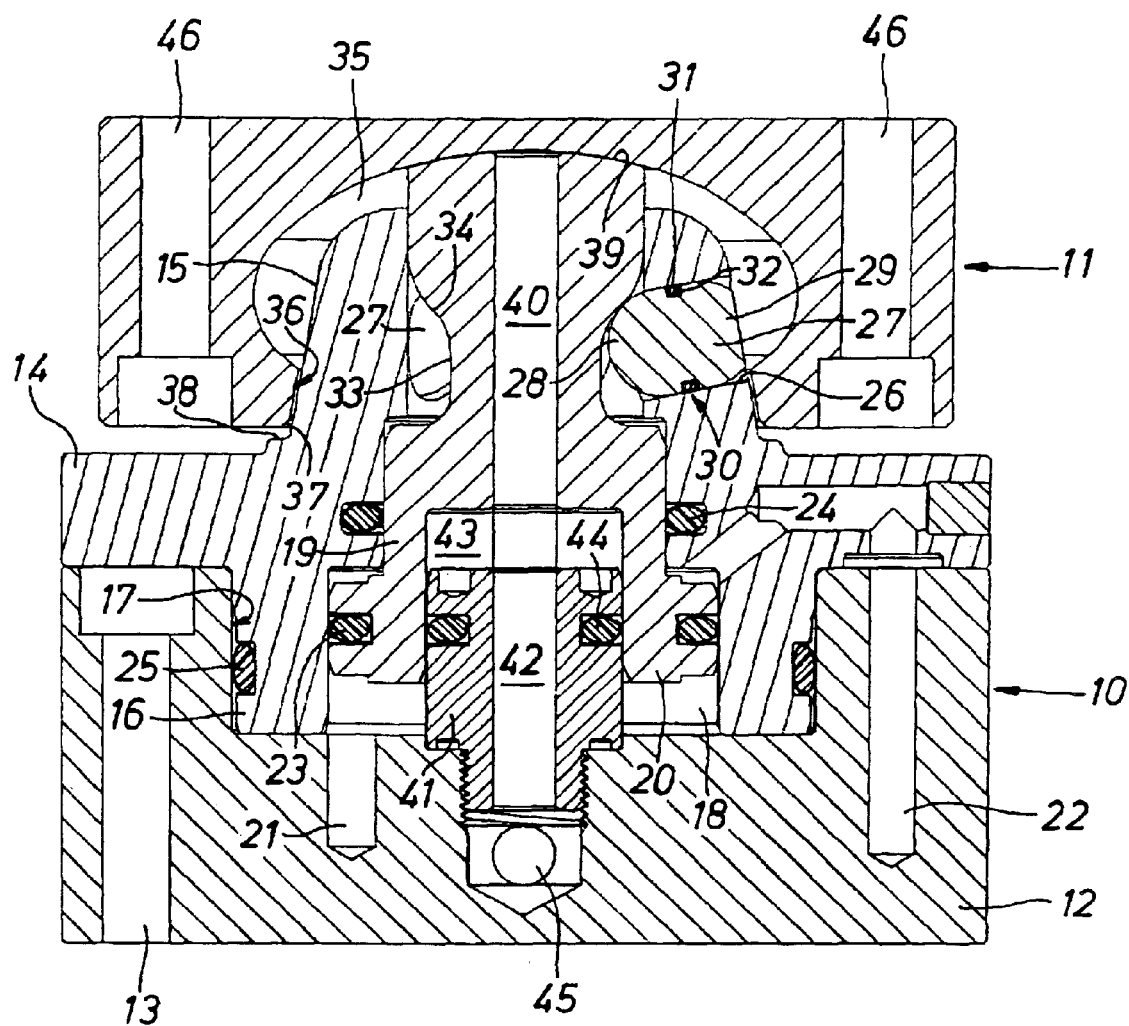
FIG. 2 shows the same arrangement as the cooperating part lands on the sliding element moved to project from the shape element.
Figure 3:
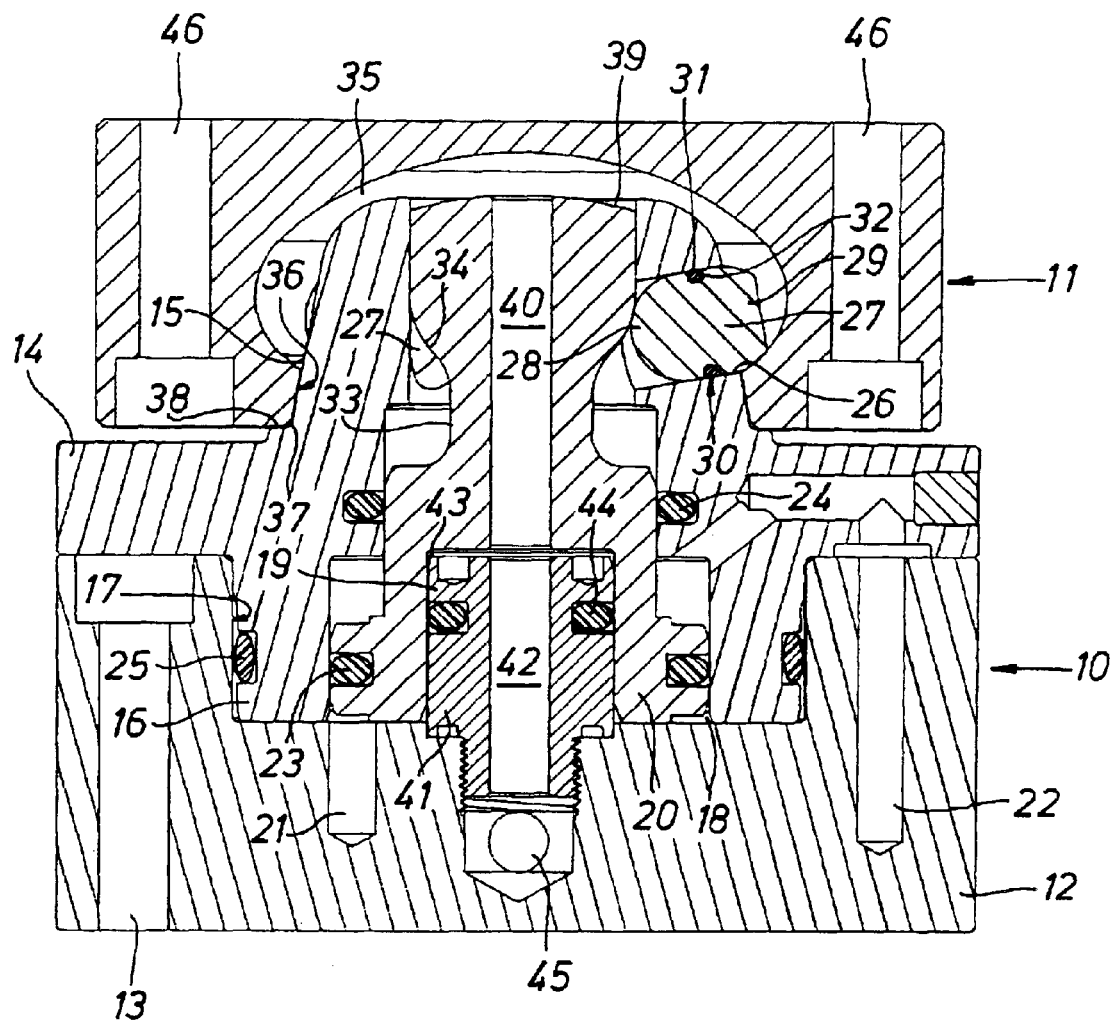
FIG. 3 shows the same arrangement in the centered clamping state.

The draw-in element 14 is provided with a concentric three step through hole 18, in which a correspondingly formed three step sliding element 19 runs. The bottom step of the sliding element 19 has a larger diameter than and is in the form of a piston 20 to be acted upon by pressure on either side. During pressure actuation by way of a first fluid connection 21, which is for example in the form of a hydraulic port, the piston 20 will move and accordingly shift the sliding element 19 upwardly into the projecting position, which is represented in FIGS. 1 and 2. In this position the top region of the sliding element 19 will project past the shape element 15. On supply of pressure by way of a second fluid connection 22, which may also be a hydraulic connection, the piston and accordingly the sliding element 19 will shift into the bottom clamping position, which is represented in FIG. 3.

The piston 20 is provided with a sealing ring 23, the middle part of the sliding element 19 again being sealed off with the aid of a sealing ring 24 let into the wall of the draw-in element 14. A further sealing ring 25 serves to provide a sealing function between the draw-in element 14 and the base plate 12.

The wall of the projecting shape element 15 possesses three radial through holes 26 of which merely two are illustrated in the figures. It is possible to provide a larger number of through holes 26, as for example five or seven through holes. In the through holes 26, which extend slightly obliquely upward, clamping elements 27 run. These clamping elements possess two hemispherical terminal regions 28 and 29, which are connected by way of a middle guide part 30 with one another for linearly being guided in the respective through hole 26. This middle guide region 30 is peripherally provided with an annular groove 31 to receive a sealing ring 32. The outer terminal region 29 is made flat so that such flattened terminal side is, in the non-clamping state in accordance with FIGS. 1 and 2, essentially flush with the outer face of the shape element 15. Owing to the two hemispherical terminal regions 28 and 29, which directly or more or less directly adjoin the annular groove 31 there are two spaced apart annular edges for guiding in the through holes 26, which prevent skew running of the clamping elements 27. Owing to the friction of the sealing ring 32 the clamping elements 27 are prevented from dropping out.

In the non-clamping state in accordance with FIGS. 1 and 2 the inner terminal region 28 of the clamping elements 27 fit into a peripheral annular recess 33 in the sliding element 19. This annular recess 33 possesses an oblique face 34, which may also be curved, and by means of which the clamping elements 27 may be thrust into the bottom clamping position outward into the clamping position on movement of the sliding element 19 into the bottom clamping position, as illustrated in FIG. 3.

The cooperating part 11 possesses a bell-like recess 35 for receiving the shape element 15. At the edge of its opening the bell-like recess 35 necessarily tapers and here has an outwardly widening conical preliminary centering face 36 which in connection with the shape element 15 serves for preliminary centering. The conical preliminary centering face 36 extends outward to merge with a further widening reference face 37, serving for the actual centering, in conjunction with a mating reference face 38 at the foot of the shape element, which is also in the form of an annular face.

For clamping firstly the top part, having the cooperating part 11 and not illustrated in the drawing, is so placed on the bottom part bearing the bolsters 10 that the shape elements 15 fit into the recess 35. This is illustrated in FIGS. 1 and 2. The sliding element 19 is caused to project upwardly, the top terminal face 39 of the projecting part of the sliding element 19 serving as a bolster face for the corresponding mating face in the bell-like recess 35. In FIG. 2 this position on the bolster is reached. Now by action of pressure by way of the second fluid connection 22 the piston 20 and accordingly the sliding element 19 are shifted downward. Therefore the top part provided with the cooperating parts 11 is lowered until the reference faces 37 rest inside the mating reference faces 38 and centering takes place. During the downward movement—as the already explained—the clamping elements 27 are moved outward into the clamping position so that the centering operation is aided and the simultaneously firm clamping takes place. The clamping elements 27 then interlock at the tapered opening of the bell-like recess 35.

For release the first fluid connection 21 is put under pressure so that the piston 20 and accordingly with it the sliding element 19 are moved back upward. This means that there is a gentle lifting of the top cooperating part 11 clear of the bottom bolsters 10, the clamping elements 27 being simultaneously shifted by the tapered edge region of the bell-like recess 35 radially inward again.

The sliding element 19 possesses a central blow-off duct 40, by way of which compressed air may emerge through the top opening of the sliding element 19. A piston part 41 is fixed to the base plate 12 and concentric to the sliding element 19, such piston having a central compressed air duct 41 and fitting into a corresponding cylindrical recess 43 in the bottom terminal region of the sliding element 19 in order to ensure pressure supply in each position of the vertically moving sliding element 19. An annular seal 44 on the piston part 41 serves for sealing. The central pressure duct 42 and the blow-off duct 41 flush with it are supplied from a compressed air connection 45.

On lowering the cooperating part 11 onto the bolster 10 a compressed air jet blows through the blow-off duct 40 and owing to the configuration of the bell-like recess 35 is deflected to effectively clean the recess 35, the top terminal face 39, the shape element 15, the reference face 37 and the mating reference face 38. Since during the clamping operation the air gap is continuously narrowed, the flow velocity reaches an extremely high value and accordingly causes an optimum cleaning effect, more particularly on the reference face 37 and the mating reference face 38.

By way of a volumetric flow measuring means the flow volume of the blow-off jet is measured. This value is a measure for the proper fit of the seat. The larger the gap between the reference face 37 and the mating reference face 38 the larger the volume of air emerging. More particularly in the clamped condition a pneumatic pressure is applied to the compressed air connection 45 and the volume of the emerging compressed air current is measured and compared with a reference value. If there are excessively large pressure differences, that is to say an excessive gap between the engaged faces, it is possible to assume that owing to dirt there is no proper engagement. Such a measure of the volumetric flow enables gap differences of down to 0.01 mm to be reliably detected.

In the working example a screw attachment means serves for securing the cooperating part 11 and the bolster 10 to the corresponding parts to be fixed. For this purpose the screw holes 13 in the base plate 12 of the bolster 10 and corresponding screw holes 46 in the cooperating part 11 are employed. It is naturally possible for other known types of attachment to be utilized, as for example weld connections, bonded joints, locking joints and screw threaded means.

In lieu of the annular recess 33 on the sliding element 19 it is naturally possible for separate recesses to be provided, which are each associated with a clamping element 27.

What is claimed is:

1. A holding means for holding two parts together and more especially for fixing a workpiece palette on a workpiece table, comprising a bolster able to be secured to the first part, such bolster possessing a projecting shape element, a cooperating part adapted to be secured to the second part, such cooperating part possessing a recess to receive the shape element, and a sliding element running in the projecting shape element, the sliding element possessing at least one peripheral recess into which at least one clamping element, which is able to be moved in a through hole in the shape element, fits in the non-clamped state, sliding of the sliding element causing the clamping element to be thrust outward into a clamping position thereof, in which the clamping element interlocks with the cooperating part in the recess thereof, wherein the clamping element possesses a central guide region for linearly guiding in the through hole which is provided with an annular groove to receive a sealing ring, hemispherical terminal regions being formed on either side of the guide region.

2. The holding means as set forth in claim 1, wherein one of the terminal regions has a flat.

3. The holding means as set forth in claim 2, wherein the flat in the non-clamping state is essentially aligned with the outer face of the shape element.

4. The holding means as set forth in claim 1, wherein at least three clamping elements are arranged distributed about the periphery.

5. The holding means as set forth in claim 1, wherein the frustoconical shape element constituting a preliminary centering arrangement with the recess which has a bell shape in the cooperating part preferably possesses a centering annular bolster face at the shape element foot region or a region adjacent to the shape element, for a corresponding mating face of the cooperating part.

6. The holding means as set forth in claim 5, wherein the recess is bell shaped.

7. A holding means for holding two parts together and more especially for fixing a workpiece palette on a workpiece table, comprising a bolster able to be secured to the first part, such bolster possessing a projecting shape element, a cooperating part adapted to be secured to the second part, such cooperating part possessing a recess to receive the shape element, and a sliding element running in the projecting shape element, such sliding element possessing at least one peripheral recess into which at least one clamping element, which is able to be moved in a through hole in the shape element, fits in the non-clamped state, sliding of the sliding element causing the clamping element to be thrust outward into a clamping position thereof, in which the clamping element interlocks with the cooperating part in the recess thereof, wherein the sliding element is connected integrally or permanently with a piston able to be acted upon by pressure on either side thereof.

8. The holding means as set forth in claim 7, wherein the sliding element in the non-clamped, projecting position projects from the shape element and wherein the terminal face of the projecting region is in the form of a bolster face for a mating face in the recess in the cooperating part.

9. The holding means as set forth in claim 8, wherein the at least one peripheral recess in the sliding element possesses an oblique actuating face for thrusting out the clamping element into the clamping position during lowering movement of the sliding element carrying the cooperating part.

10. A holding means for holding two parts together and more especially for fixing a workpiece palette on a workpiece table, comprising a bolster able to be secured to the first part, such bolster possessing a projecting shape element, a cooperating part adapted to be secured to the second part, such cooperating part possessing a recess to receive the shape element, and a sliding element running in the projecting shape element, such sliding element possessing at least one peripheral recess into which at least one clamping element, which is able to be moved in a through hole in the shape element, fits in the non-clamped state, sliding of the sliding element causing the clamping element to be thrust outward into a clamping position thereof, in which it interlocks with the cooperating part in the recess thereof, wherein the shape element or the sliding element and the shape element and the sliding element comprise at least one fluid pressure duct, whose at least one blow-off opening is directed toward the recess in the cooperating part.

11. The holding means as set forth in claim 10, wherein the recess in the cooperating part possesses a bell-like inner configuration adapted to redirect the air current and also to clean the shape element.

12. The holding means as set forth in claim 10, comprising a volumetric flow measuring means for checking positions, such means being associated with the pressure duct.

13. The holding means as set forth in claim 12, wherein the volumetric flow measuring means can be activated prior to reaching the clamping position and in the clamping position.

* * * * *